Sept. 26, 1961     T. J. AUSTIN     3,001,748

SNAP-IN MIRROR HOLDER

Filed Aug. 3, 1959

INVENTOR,
THOMAS AUSTIN;
BY Calvin Brown,
ATTORNEY

United States Patent Office 3,001,748
Patented Sept. 26, 1961

3,001,748
SNAP-IN MIRROR HOLDER
Thomas John Austin, Rolling Hills, Calif., assignor to Armored Luggage Mfg. Co., Hawthorne, Calif., a corporation of California
Filed Aug. 3, 1959, Ser. No. 831,091
4 Claims. (Cl. 248—28)

The present invention relates to a type of molding adapted to allow a mirror to be held along two edge portions in such a manner that the mirror may be held thereby and protected from shock to reduce mirror breakage.

The invention is particularly applicable to so-called cosmetic or make-up cases which usually incorporate a mirror positioned on the inside surface of the cover member.

An object of the invention is to provide a form of molding or framing which may be cut to length and readily incorporated in a case structure such as in the cover member therefor to hold the mirror, the said molding or framing being shaped in cross section so as to flex or distort without permanent deformation. Thus if the mirror does become broken, it is easily removed from the molding and a new mirror installed.

The invention has for further objects a type of molding or framing which may be utilized for holding various and sundry objects, which is economical in cost of manufacture, efficient in use, and superior to methods and means now employed for mounting a mirror within a case.

With the above mentioned and other objects in view, the invention consists of the novel and useful provision, formation, construction, association and relative arrangement of parts, members, and features, all as disclosed in one embodiment in the accompanying drawing, described generally and more particularly pointed out in the claims.

Figure 1:
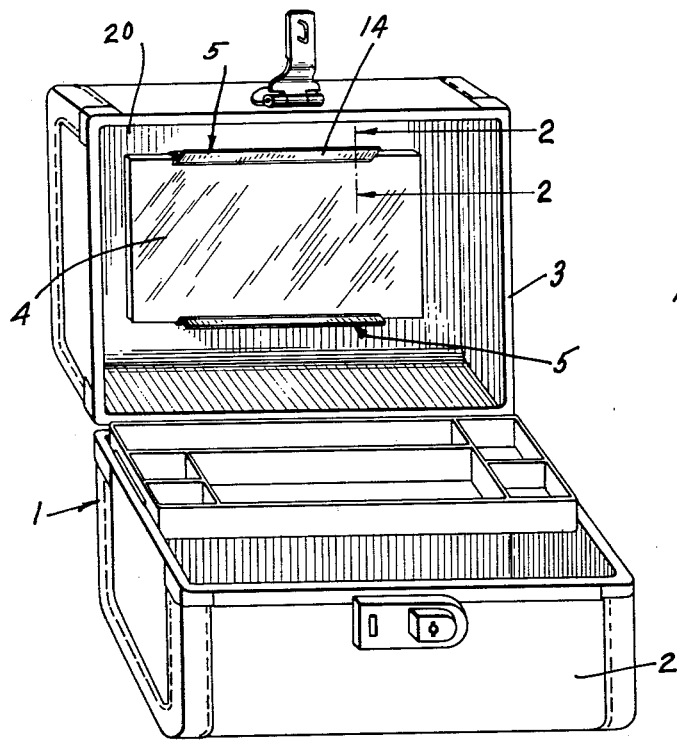
FIGURE 1 is a perspective view of a make-up or cosmetic case embodying the invention.

Referring now to the drawing, I have shown in FIGURE 1 a case 1 of a type which may be employed for the holding of cosmetics and generally known as a make-up case, the case having a base member 2 and a cover 3 and within the cover is a mirror 4 held by a molding or a framing 5 incorporating the present invention. Generally in cases of the type depicted, the mirror may take various forms although rectangular mirrors are generally employed, as shown. Mirrors are subjected to considerable shock particularly if the case is dropped and under such conditions of rough handling, the mirror may be broken. Often the mirrors are secured directly to the inner surface of the case cover, and in case of mirror breakage the task of removing the broken mirror and replacing it entails not only time, but expense.

With my invention I am enabled to snap a mirror into position utilizing the molding or framing 5 of the invention and in such a manner that in case of mirror breakage the broken mirror may be readily removed from the framing or molding and replaced with a new mirror. Furthermore, the framing or molding 5 of my invention is so arranged and fabricated as to in and of itself act as a cushioning element between the mirror and the case for the purpose of overcoming transferal of shock from the case to the mirror.

Figure 3:
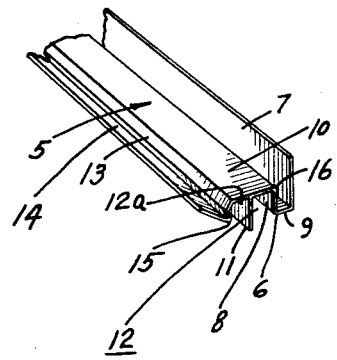
Figure 2:
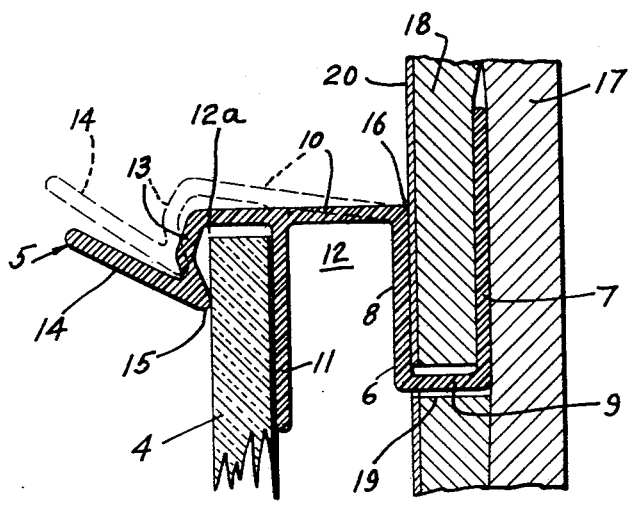
FIGURE 2 is an enlarged fragmentary, cross sectional view taken on the line 2—2 of FIGURE 1; and, FIGURE 3 is a fragmentary, perspective view of the molding or framing of the invention.

Referring to both FIGURES 2 and 3, the molding or framing 5 may be formed from various materials although I have found plastic satisfactory particularly a plastic which is flexible so far as relative separation of parts is concerned, but at the same time rigid enough to sustain the weight of the mirror 4. I may specifically mention various plastics such as a nylon, a vinyl chloride, vinyl butyral, as well as other plastics both of the filled and unfilled type and which may be shaped either by compression molding or by injection molding. The coloring of the plastic is, of course, optional and I have found that a transparent plastic lends a pleasing appearance.

In FIGURES 2 and 3 I have formed the molding or framing so that the same is of integral structure, which is to say, formed in one piece and which has channel portion 6 formed by two strips constituting legs 7 and 8, the leg 7 in the present instance being of greater transverse dimension or width than leg 8 and an interconnecting crown piece 9. The leg 8 joins with a top or crown piece 10 from which intermediately depends a leg 11 to form a channel portion 12, the top 10 being of sufficient width to provide for a further channel portion 12a, wherein the top 10 provides the crown together with the leg 11 and a further leg 13. The leg 13 is not planar but is either concavo-convex in form as shown, or of V-shaped formation, the said leg 13 joining with a further leg or lip 14 extending outwardly at an acute angle to its point of joinder or vertex 15 with the leg 13. The leg or lip 14 in one instance will extend upwardly and when reversed will extend downwardly at an angle to either a vertical or an horizontal plane. The leg 13 has less depth or width than that of leg 11. As shown in FIGURE 2, upward pressure against the lip or leg 14 will flex the top 10 relative to the leg 8 at the vertex line 16 as shown by the dotted line position in said figure and this flexing is sufficient to release an object held between the legs 11 and 13.

To incorporate my invention within the case 1, the back of the case in the present instance is formed of cardboard and preferably of two cardboard members as shown at 17 and 18. The channel portion 6 of the molding or framing receiving a portion of the cardboard member 18 as shown in FIGURE 2. This is easily accomplished by providing a slot at 19 in the cardboard member 18 to accommodate crown 9, the leg 7 positioned between the two cardboard members. The channel portion 6 will also receive a portion of the covering 20 for the inside of the case. Obviously, the case is finished in various and sundry manners on the interior thereof depending to a large extent upon the money value of the case.

The operation, uses and advantages of the invention just described are as follows.

A given width of mirror 4 is selected for a given spacing between two parallel molding or channel members 5 and the upper and lower molding or framing members are then secured to the inside of the cover of the case in the manner illustrated in FIGURE 2. The mirror which is preferably rectangular in form as shown in FIGURE 1, is then snapped into position which may be accomplished in several ways such as by placing the lower edge of the mirror in the elongated channel 12a and then pushing the top edge of the mirror against the inclined leg of lip 14 which will flex the top or crown 10 upwardly in the manner shown in FIGURE 2 in dotted lines and allow reception of the upper edge of the mirror within the channel 12a of the upper molding or framing. In case of mirror breakage, the broken mirror is easily removed by flexing the molding in the manner shown in FIGURE 2 from the full line position to the dotted line position thereof. It is important to note that the mirror is held by the molding or framing spaced from the inside of the cover member; to wit: the spacing afforded by the channel 12, thus direct shock to the mirror is eliminated, or at best cushioned as the molding or framing will flex under shock. By selecting a plastic for the molding or framing which is relatively flexible and still rigid, various weights of mirrors are easily carried.

It is to be particularly noted that the mirror is backed by the legs 11 of the upper and lower molding or framing members, while the mirror face has contact only with the vertex line 15, the leg 13 not otherwise contacting the mirror face. As leg 13 is of V or curved form, the vertex line 15 has compressive engagement with the mirror.

I claim:

1. A molding for resiliently holding a mirror in place spaced from and parallel to a movable supporting surface, comprising a unitary strip of flexible material having a side wall for engagement with said movable surface, two legs for receiving between them an edge of the mirror, and a portion of the strip extending from said side wall of the most distant of the two legs so that said two legs with a part of said portion form a mirror receiving channel and the remaining part of said portion spaces the channel from the side wall to permit limited movement of the channel when the supporting surface is jarred while the mirror is in place, whereby the mirror is protected from shock with a consequent reduction in mirror breakage.

2. The molding of claim 1 in which said most distant leg is concave inwardly and has a shelf-like lip which lip makes an acute angle with the proximate portion of said most distant leg, the other leg of the mirror receiving channel being flat and parallel to the side wall to support the rear of the mirror with a relatively large surface area of contact while the vertex edge at the junction of the lip and proximate portion of the most distant leg engages the front of the mirror with relatively less surface area of contact while pressing the mirror against the flat leg.

3. In a device for resiliently supporting a mirror in a traveling case so as to minimize breakage while affording ready means for replacement: the combination with a mirror of two spaced parallel strips of molding, the lower strip holding the bottom edge of the mirror spaced from and parallel to a wall of the traveling case, the upper strip being a unitary piece of flexible plastic having a side wall for engagement with said wall of the traveling case, said upper strip having two side-by-side channels with a common flat leg between them, one of the channels including said side wall as one leg and the common flat leg as the other leg and the other channel including the common flat leg and an inwardly concave outer leg to press the upper edge of the mirror against said common flat leg, the two channels having their tops formed by a portion of the strip extending from the side wall thereof to the concave leg, said outer leg having a shelf-like lip meeting the proximate portion of the outer leg at an acute angle to form against the mirror a rounded vertex edge, the two molding strips being spaced apart by a distance greater than the height of the mirror so that the top of the mirror will be below the inside surface of the portion of the strip forming the top of the mirror receiving channel and the outer leg of the mirror receiving channel is out of contact with the mirror except at its rounded vertex edge, whereby when said shelf-like lip is lifted the mirror may readily be removed from the upper strip of molding.

4. A strip of flexible material to cooperate with a similar strip to hold a mirror in snap-in position in a traveling case: said strip comprising a central spacing channel formed by a crown and two parallel flat legs; an outer mirror receiving channel of which the outer leg of the spacing channel forms one leg, the other leg resiliently presses the mirror against said one leg and the crown is an extension of the crown of the central spacing channel; and an inner holding channel of which one leg is a side wall to engage the traveling case, the other leg of the holding channel being parallel to said side wall and the crown connecting the two legs of the holding channel being shorter in length than either leg of the holding channel; the leg resiliently pressing the mirror having an extension directed away from the mirror to afford a convenient means for releasing the mirror, the extension and the three channels being integral.

References Cited in the file of this patent

UNITED STATES PATENTS

| | | |
|---|---|---|
| 1,879,403 | Monroe | Sept. 27, 1932 |
| 1,893,594 | Oestreich | Jan. 10, 1933 |
| 2,064,047 | Wertz | Dec. 15, 1936 |
| 2,811,328 | Ericson | Oct. 29, 1957 |
| 2,907,537 | Mapson | Oct. 6, 1959 |

FOREIGN PATENTS

| | | |
|---|---|---|
| 212,142 | Great Britain | Mar. 6, 1924 |